United States Patent [19]
Anderson

[11] Patent Number: 5,162,055
[45] Date of Patent: Nov. 10, 1992

[54] BULB FORMING ORIFICE PLATE FOR BULB MAKING APPARATUS

[75] Inventor: William H. Anderson, Wellsboro, Pa.

[73] Assignee: GTE Products Corporation, Stamford, Conn.

[21] Appl. No.: 879,733

[22] Filed: May 6, 1992

Related U.S. Application Data

[63] Continuation of Ser. No. 696,678, May 7, 1991, abandoned.

[51] Int. Cl.⁵ .............................................. C03B 9/12
[52] U.S. Cl. ........................................ 65/184; 65/185; 65/DIG. 1
[58] Field of Search ............ 65/184, 185, 186, DIG. 1

[56] References Cited

U.S. PATENT DOCUMENTS

| | | | |
|---|---|---|---|
| 3,407,055 | 10/1968 | Argyle et al. | 65/184 X |
| 3,635,689 | 1/1972 | Kurokawa | 65/185 |
| 3,647,410 | 3/1972 | Heaton | 65/184 |
| 3,652,253 | 3/1972 | Small | 65/184 |

FOREIGN PATENT DOCUMENTS 701672  12/1953  United Kingdom ................ 65/184

Primary Examiner—Robert L. Lindsay
Attorney, Agent, or Firm—William H. McNeill

[57] ABSTRACT

An orifice plate for a glass ribbon machine has an orifice provided with a side wall having a continuously variable angle. When used for making envelopes for incandescent lamps, the plate provides stronger bulbs.

1 Claim, 4 Drawing Sheets

BULB FORMING ORIFICE PLATE FOR BULB MAKING APPARATUS

This is a continuation of copending application Ser. No. 07/696.678, filed on May 7, 1991 abondoned.

TECHNICAL FIELD

This invention relates to an orifice plate for a bulb forming machine. It also relates to the bulb formed by the orifice plate.

BACKGROUND ART

Glass ribbon machines and other apparatus for making proto-bulbs for hollow glass article such as, e.g., incandescent lamps, are well known. Such machines are exemplified by those shown in U.S. Pat. Nos. 3,642,461; 3,647,410; and 3,775,084, and the teachings of these patents are herein incorporated by reference.

The orifice plate, through which the molten glass is expelled for the forming operation, is an integral part of the ribbon machines.

The standard design for orifice plates has included an orifice in the form of an inverted infundibulum which may be counterbored. The sides of the orifice, at least above any counterbore, form a constant angle of between 11° and 15° from the vertical.

It has now been discovered that this plate design often causes catastrophic breakage of the glass article being formed, either when it is being removed from the machine or subsequently, during handling and use.

DISCLOSURE OF INVENTION

It is, therefore, an object of the invention to obviate the disadvantages of the prior art.

It is another object of the invention to enhance the operation of glass ribbon machines.

Still another object of the invention is the strengthening and enhancement of light bulb envelopes.

These objects are accomplished, in one aspect of the invention, by the provision of an orifice plate which comprises a substantially flat member having a given thickness and a through-orifice therein. The orifice has a side wall which is provided with a continuously variable angle.

The proto-bulb produced by the improved orifice has a closed body with an elongated neck projecting therefrom. The neck terminates in an open end and has an external, circumferential bead adjacent thereto. The bead has a circumferential axis and an asymmetric thickness arrayed thereabout. The extra thickness, which is positioned closest to the open neck, is believed to cause less stress to be induced in the bulb during removal from the orifice plate. Also, more glass in the critical area near the point of fracture results in a stronger article having reduced breakage during shipment and subsequent use.

These improved results are believed to be derived from the elimination of the constant angle on the orifice and the elimination of the sharp or only slightly rounded edge at the bottom of the orifice.

BEST MODE FOR CARRYING THE INVENTION

For a better understanding of the present invention, together with other and further objects, advantages and capabilities thereof, reference is made to the following disclosure and appended claims taken in conjunction with the above-described drawings.

Figure 1:
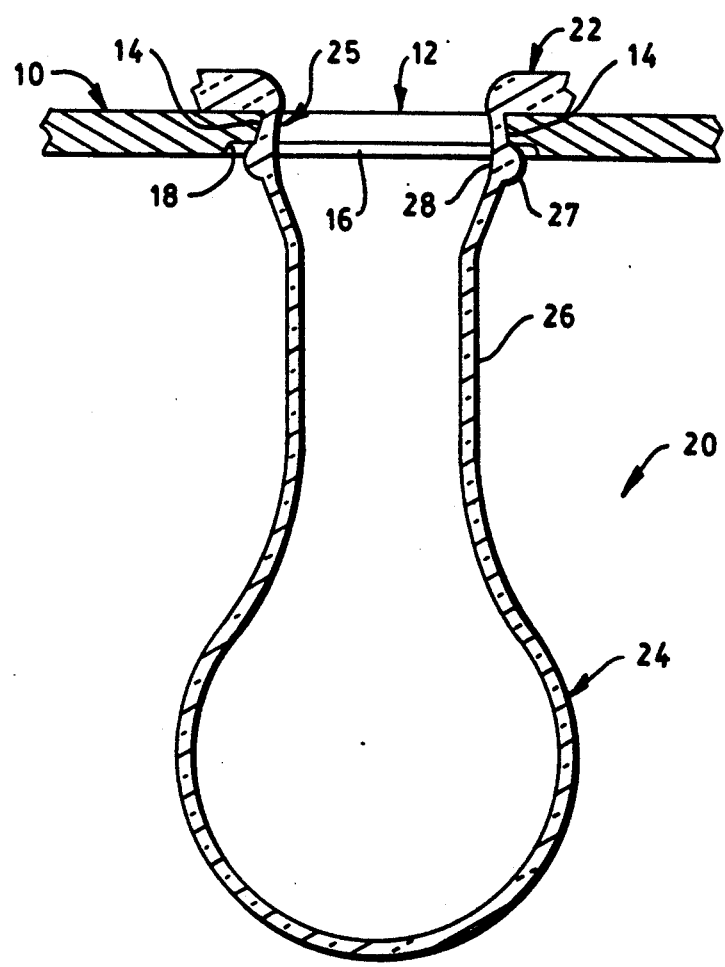
FIG. 1 is an elevational, sectional view of a prior art orifice plate and a formed bulb.

Referring now to the drawings with greater particularity, there is shown in FIG. 1 a prior art orifice plate 10 having an orifice 12 therein. The orifice 12 has sides 14 formed at a constant angle, usually between 11° and 15° from the vertical. The plate 10 has a counterbore 16 with side walls 18.

A glass article, in this instance a proto-bulb 20 formed from glass ribbon 22, depends from plate 10. As used herein, a proto-bulb is a thin walled, hollow article which subsequently will be employed as the envelope of an incandescent lamp.

Figure 2:
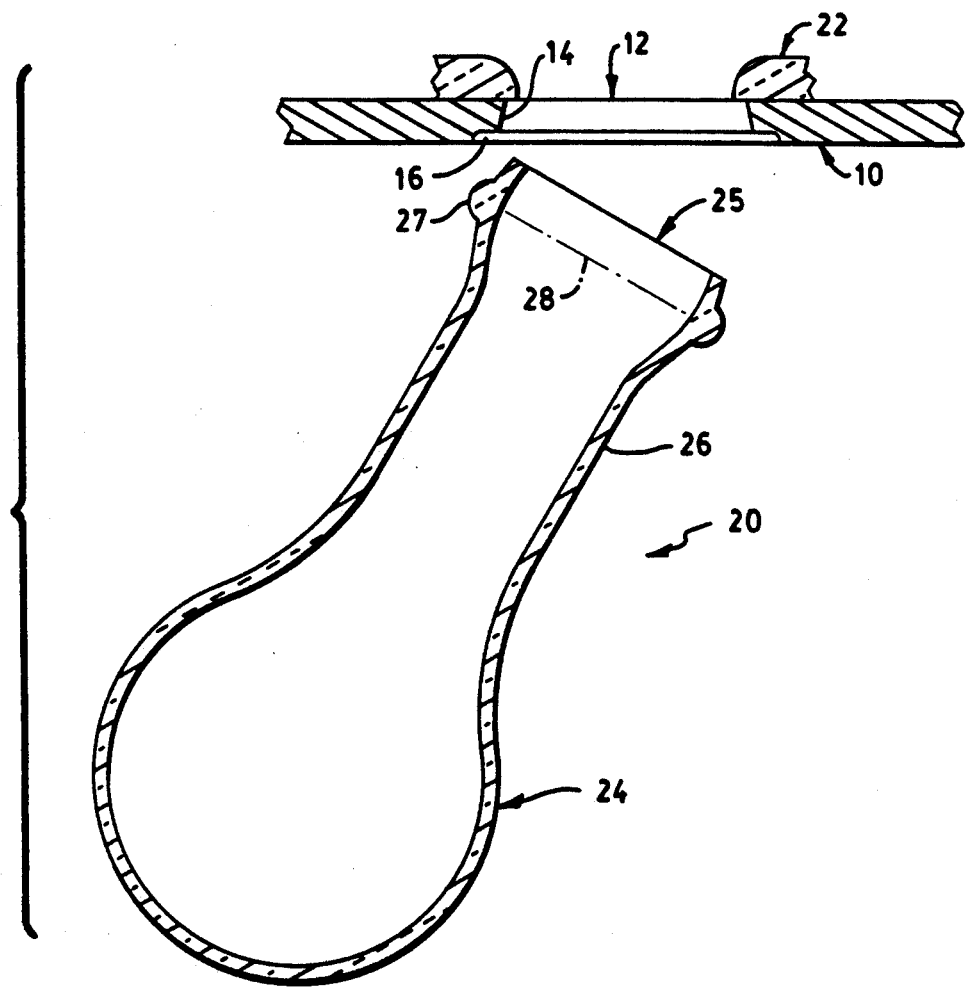
FIG. 2 is a view similar to FIG. 1 illustrating bulb removal from the orifice plate.

The bulb 20 has a closed body end 24 and an elongated neck 26 which projects therefrom. The neck 26 has an open end 25 which, as formed, is adjacent plate 10. An external, circumferential bead 27 surrounds the open end 25 and has a circumferential axis 28. The bead 27 is substantially symmetrically arrayed about axis 28. (See FIG. 2)

Figure 3:
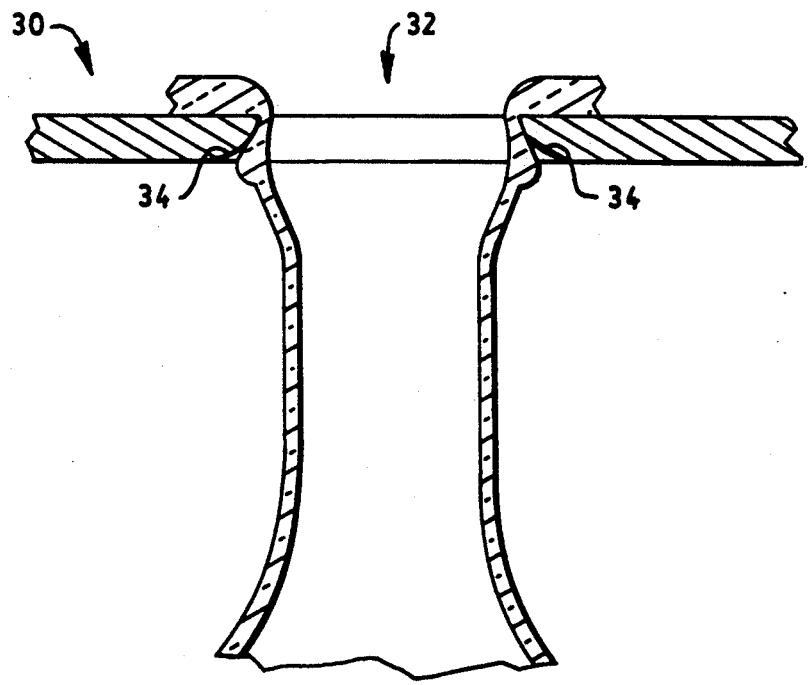
FIG. 3 is an elevational, sectional view illustrating an embodiment of the orifice plate of the invention.
Figure 3A:
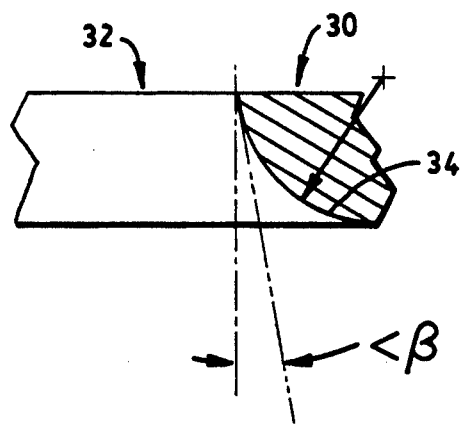
FIG. 3a is an enlarged, partial sectional view of an orifice.

Referring now to FIG. 3, there is shown an embodiment of the invention wherein there is provided an orifice plate 30 having an orifice 32 therein. The orifice 32 has a side wall 34 formed as a continuously variable angle and, in the particular embodiment shown, is formed as a radius. In the preferred embodiment, plate 30 had a thickness of 0.250" and was constructed of H13 tool steel. Orifice 32 had a nominal upper diameter of 1.444" and a nominal lower diameter of 1.944". The side wall 34 was formed with a constant radius of 0.299" having a center point 0.046" above the upper surface of plate 30. The radius was tangent to a line forming an angle $\beta$ from the vertical. Angle $\beta$ is preferably between 11° and 15° from the vertical and in the preferred embodiment is 11.25°. (See FIG. 3a). Additionally, a small vertical wall 33 can be provided at the upper surface of plate 30. Wall 33 can have a height of between 0.010 and 0.015 inches. All sharp corners should be broken.

The radius dimension is greater than the sum of the dimensions of the plate thickness and the height of the center point above the plate, whereby the lower end of the curve over-blends smoothly into the bottom of the orifice plate 30, thus insuring a smooth transition with no sharp edge. This result can be achieved if the radius is about 101% of the plate thickness plus center point height.

Figure 4:
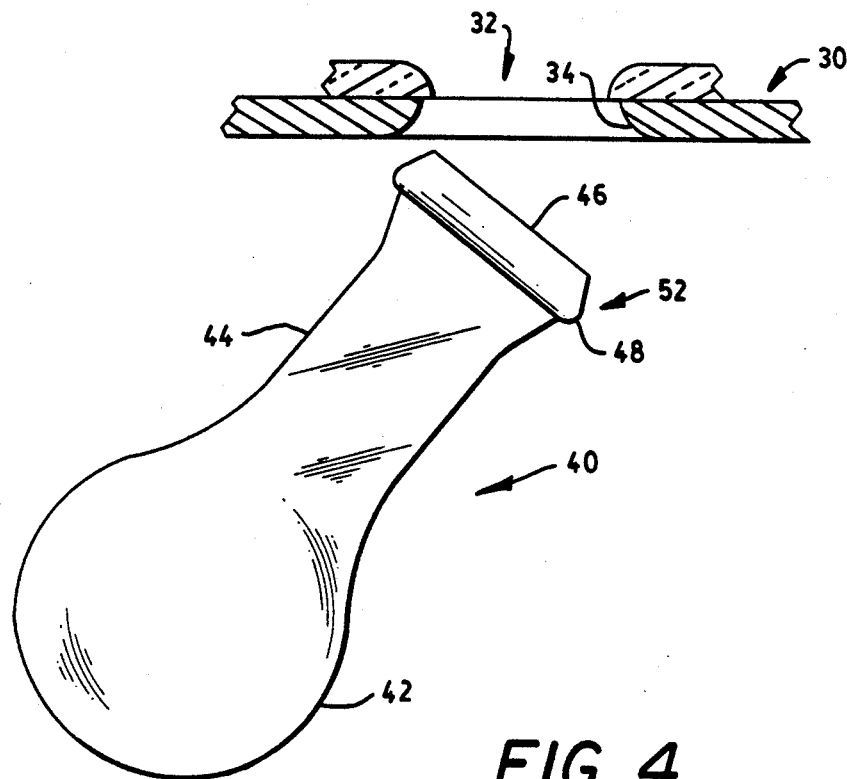
FIG. 4 is a view similar to FIG. 3 illustrating bulb removal.

Referring now to FIG. 4, a proto-bulb 40 has a closed body end 42 and an elongated neck 44 projecting therefrom. The neck 44 terminates in an open end 46. An external, circumferential bead 48, having a circumferential axis 50 (see FIG. 5) is adjacent the open end 46. The bead 48 has an asymmetric thickness arrayed about axis 50, with the asymmetry occurring on the side 52 of bead 48 which is closest to the open end 46.

Figure 5:
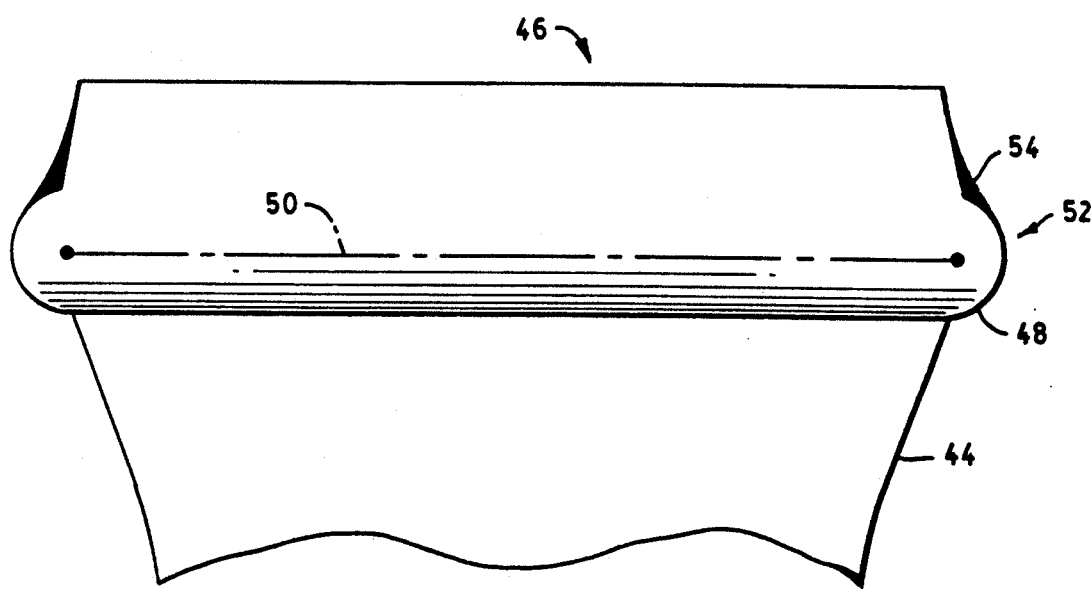
FIG. 5 is an enlarged, diagrammatic view of a bulb neck illustrating the added material.

This asymmetry can be seen more clearly in FIG. 5, wherein the added thickness 54 is shown as a fillet. The concave surface of the fillet, which allows the bulb to roll from the orifice plate, may also contribute to the reduced stress.

Proto-bulbs having the asymmetric bead with the added thickness of material have been proven in tests to be stronger and less prone to catastrophic breakage both in the manufacturing process and in subsequent handling and use.

Other continuously variable angles, such as parabolas, hyperbolas, and elliptic sections can also be employed.

While there have been shown and described what are at present considered to be the preferred embodiments of the invention, it will be apparent to those skilled in the art that various changes and modifications can be made herein without departing from the scope of the invention as defined by the appended claims.

I claim:

1. In combination with a glass ribbon apparatus, an orifice plate for making hollow glass articles, said plate comprising a substantially flat member having an upper surface and a lower surface defining a given thickness therebetween and a through-orifice therein, said orifice having a side wall, the improvement comprising: said side wall of said orifice having a continuously variable angle formed by a constant radius, the center point for said radius being outside the plane of said plate and said radius begining near said upper surface and being tangent to an angle of between 11° and 15°.

* * * * *